(12) United States Patent
Kaneda et al.

(10) Patent No.: US 11,959,702 B2
(45) Date of Patent: Apr. 16, 2024

(54) AIR SEPARATION DEVICE

(71) Applicant: L'Air Liquide, Societe Anonyme pour l'Etude et l'Exploitation des Procedes Georges Claude, Paris (FR)

(72) Inventors: Takuya Kaneda, Kobe (JP); Tsuyoshi Sugitani, Kobe (JP)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 387 days.

(21) Appl. No.: 17/192,426

(22) Filed: Mar. 4, 2021

(65) Prior Publication Data

US 2021/0278132 A1 Sep. 9, 2021

(30) Foreign Application Priority Data

Mar. 5, 2020 (JP) .................................. 2020-037522

(51) Int. Cl.
*F25J 3/00* (2006.01)
*B01D 53/04* (2006.01)
*F25J 3/08* (2006.01)

(52) U.S. Cl.
CPC ............ *F25J 3/08* (2013.01); *B01D 53/0438* (2013.01); *B01D 53/0454* (2013.01); *B01D 2256/10* (2013.01); *B01D 2256/12* (2013.01); *B01D 2257/504* (2013.01); *B01D 2257/80* (2013.01); *F25J 2210/40* (2013.01); *F25J 2215/42* (2013.01); *F25J 2215/50* (2013.01)

(58) Field of Classification Search
CPC ........ F25J 3/08; F25J 2210/40; F25J 2215/42; F25J 2215/50; B01D 53/0438; B01D 53/0454; B01D 2256/10; B01D 2256/12; B01D 2257/504; B01D 2257/80
USPC ........................................................ 62/640
See application file for complete search history.

(56) References Cited

U.S. PATENT DOCUMENTS

| | | | |
|---|---|---|---|
| 5,406,800 | A | 4/1995 | Bonaquist |
| 5,546,765 | A | 8/1996 | Nagamura et al. |

(Continued)

FOREIGN PATENT DOCUMENTS

| | | |
|---|---|---|
| DE | 30 12 062 | 10/1981 |
| EP | 0 519 688 | 3/1995 |

(Continued)

OTHER PUBLICATIONS

EP Search Report and Written Opinion for EP 21 15 6493, mailed Jan. 31, 2022.

*Primary Examiner* — Davis D Hwu
(74) *Attorney, Agent, or Firm* — Justin K. Murray

(57) ABSTRACT

An air separation device can include: a first compressor and a second compressor for compressing feed air; a first refrigerator and a second refrigerator for cooling the feed air; a pre-purification unit for pre-purifying the feed air; a flow rate measuring unit for measuring the flow rate of the feed air; a main heat exchanger for subjecting the feed air to heat exchange; a purification portion into which the feed air led out from the main heat exchanger is fed, and which separates and purifies product nitrogen and/or product oxygen from the feed air; and a compressor control unit for controlling the feed quantity of the feed air in accordance with an increase or decrease in the production quantity of product nitrogen and/or product oxygen.

4 Claims, 2 Drawing Sheets

(56) References Cited

U.S. PATENT DOCUMENTS

| | | | |
|---|---|---|---|
| 6,073,463 A | 6/2000 | Espie | |
| 2010/0024640 A1 | 2/2010 | Blouin | |
| 2010/0192628 A1* | 8/2010 | Jibb | F25J 5/002 |
| | | | 165/166 |
| 2010/0287986 A1* | 11/2010 | Jibb | F28F 3/025 |
| | | | 62/640 |
| 2012/0125044 A1 | 5/2012 | Prosser et al. | |
| 2015/0345857 A1* | 12/2015 | Rauch | F25J 3/04781 |
| | | | 62/615 |

FOREIGN PATENT DOCUMENTS

| | | |
|---|---|---|
| EP | 0 925 821 | 6/1999 |
| EP | 1 284 402 | 2/2003 |
| EP | 2 111 905 | 10/2009 |
| EP | 2 600 089 | 6/2013 |
| JP | H08-86564 | 4/1996 |
| JP | H10 325 673 | 12/1998 |
| JP | 2001 116 449 | 4/2001 |
| JP | 2003-106763 | 4/2003 |

* cited by examiner

AIR SEPARATION DEVICE

CROSS REFERENCE TO RELATED APPLICATIONS

This application claims the benefit of priority under 35 U.S.C. § 119 (a) and (b) to Japanese patent application No. JP2020-037522, filed Mar. 5, 2020, the entire contents of which are incorporated herein by reference.

FIELD OF THE INVENTION

The present invention relates to an air separation device.

BACKGROUND OF THE INVENTION

Feed air that is fed to an air separation device is pre-compressed and cooled, and after pre-purification (decarbonisation and dehumidification) is passed through a heat exchanger and fed to a distillation column (see, for example, patent literature articles 1 and 2).

Since the production quantity of product nitrogen or product oxygen produced by the air separation device fluctuates in accordance with demand, the operator must control the feed quantity of the feed air in accordance with the production quantity. Pressure adjustment settings for a low-pressure distillation unit are carried out manually as a method for controlling the feed air feed quantity when the production quantity increases or decreases significantly. Further, a liquid level indication for a liquefied air pool, which is oxygen-enriched liquid in a lower portion of a medium-pressure distillation unit, may not be stable if the production quantity increases or decreases significantly. Further, if load adjustment (feed quantity adjustment or production quantity adjustment) is performed at a certain speed or higher, the air separation device may not be stable when the liquefied air pool is sent to the low-pressure distillation unit. In such circumstances, the operator stabilises the situation by manually manipulating various setting units.

Further, if the production quantity increases or decreases significantly, it is not sufficient to use only an operation-side compressor that constantly compresses the feed air, and a standby-side (spare) compressor is required. Starting and stopping of the standby-side (spare) compressor must be controlled in such situations. Further, operational adjustments are performed manually after the standby-side (spare) compressor has been pressurised and the discharge valve opened to achieve a parallel state with the operation-side compressor. Similar manipulations are also performed manually when the standby-side (spare) compressor is stopped.

Further, if two refrigerators, namely a constantly operating operation-side refrigerator and a standby-side (spare) refrigerator, are installed in parallel to cool the compressed feed air that has been compressed by the compressors, the operator determines the number of refrigerators required to operate in accordance with the feed quantity and temperature of the compressed feed air, and manually starts or stops the standby-side refrigerator in accordance with the required cooling capacity.

Further, the process time for each pre-purification process (adsorption process, regeneration process) for the compressed feed air is determined using a cycle determined by the operator.

However, from the point of an operation setting measurement unit of the air separation device, it is very difficult to minimise fluctuations of the air separation device that accompany load adjustments if a manipulation to increase the load (production quantity) from 39% to 96%, or conversely to reduce the load from 96% to 39%, for example, is performed manually. Further, the number of manipulations is great, and there is a risk that incorrect operations may occur. In addition, there is also a problem in that intuitive predictive manipulations by the operator must be relied upon.

SUMMARY OF THE INVENTION

Accordingly, an object of the present invention is to provide an air separation device with which manual manipulations are reduced even if the production quantity increases or decreases significantly, with which the load (production quantity) can be adjusted automatically in accordance with the demand, and with which the operation (start and stop, discharge quantity control) of the compressors and the refrigerators can be performed automatically.

Another objective is to provide an air separation device capable of optimally performing the pre-purification processes (adsorption process, regeneration process).

An air separation device (100) according to the present invention is provided with: a first compressor (C1) for compressing feed air; a second compressor (C2) installed in series or in parallel with the first compressor (C1); a first refrigerator (R1) for cooling the feed air (compressed air) that has been compressed by the first compressor (C1) and/or the second compressor (C2); a second refrigerator (R2) in series or in parallel with the first refrigerator (R1); a pre-purification unit (50) for pre-purifying (removing carbon dioxide and/or moisture, for example) the feed air (cooled compressed air) that has been cooled by the first refrigerator (R1) and/or the second refrigerator (R2); a flow rate measuring unit (F1) for measuring (upstream or downstream of a main heat exchanger (1)) the flow rate of the feed air (pre-purified feed air) that has been pre-purified by the pre-purification unit (50); a main heat exchanger (1), into which the feed air (pre-purified feed air) that has been pre-purified by the pre-purification unit (50) is introduced for heat exchange (with a heat source); a purification portion into which the feed air led out from the main heat exchanger (1) is fed, and which separates and purifies product nitrogen (high-purity nitrogen) and/or product oxygen (high-purity oxygen) from the feed air, and a control unit (200) for controlling the feed quantity (introduction quantity) of feed air (for controlling the discharge quantity from the operation-side compressor) in accordance with an increase or decrease in the production quantity of product nitrogen and/or product oxygen.

In certain embodiments, the control unit can include: a pressure setting unit (201) which determines a pressure setting value in accordance with (measured data from the flow rate measuring unit (F1) that measures) the flow rate of the feed air fed to the purification portion; a liquid level setting unit (202) which, in accordance with (the measured data from the flow rate measuring unit (F1) that measures) the flow rate of the feed air fed to the purification portion, determines (a range from an upper limit to a lower limit of) a liquid level setting value for oxygen-enriched liquid collected in the distillation portion, and a compressor automatic drive unit (203) which automatically starts the standby-side first compressor (C1) or second compressor (C2) if (the measured data from the flow rate measuring unit (F1) that measures) the flow rate of the feed air is at least equal to a first flow rate threshold, and automatically stops the compressor that is to be put on standby, selected from among the first compressor (C1) and the second compressor (C2), if (the measured data from the flow rate measuring unit (F1) that measures) the flow rate of the feed air is at most equal to a second flow rate threshold lower than the first flow rate threshold (or is less than the first flow rate threshold).

In certain embodiments, the control unit can include: a pressure adjusting unit (280) for adjusting the pressure in the distillation portion (for example, the pressure in a low pressure column or a high pressure column, the measured value from a pressure measuring unit (P14 or P12)), by releasing gas (for example, waste gas, nitrogen-enriched gas) led out from the distillation portion (by using a vent (54) to control the released quantity of gas that is released to the atmosphere), to achieve the pressure setting value, and a lead-out quantity control unit (290) for controlling the opening degree of a control valve (V2) that adjusts the lead-out quantity of oxygen-enriched liquid (sent from a column bottom portion (21) of a high pressure column (2) to a distillation portion (42) of a low pressure column (4)), in such a way that the liquid level setting value is reached (by measured data from a liquid level measuring unit (201)).

In certain embodiments, the compressor automatic drive unit (203) may perform control such that the discharge valve of the standby-side compressor is changed from closed to open, to merge with the feed air discharged from the operation-side compressor, if the pressure difference between the discharge pressure (the discharge pressure is measured by a pressure measuring unit provided in the compressor) of the (standby-side) compressor that has started automatically and the discharge pressure of the operation-side compressor is at most equal to a threshold value.

In certain embodiments, the compressor automatic drive unit (203) may control a vent (51) that discharges to the atmosphere and that is provided on the discharge side of the first and second compressors (C1, C2), such that the quantity of feed air that has been discharged from the standby-side compressor and is discharged to the atmosphere is increased or decreased, and the quantity thereof that is caused to merge with the feed air discharged from the operation-side compressor is decreased or increased, in accordance with (the measured data from the flow rate measuring unit (F1) that measures) the flow rate of the feed air fed to the purification portion.

In certain embodiments, the control unit (200) may control the discharge quantity from the first compressor (C1) by controlling the opening degree of a discharge valve of the first compressor (C1).

In certain embodiments, the control unit (200) may control the discharge quantity from the second compressor (C2) by controlling the opening degree of a discharge valve of the second compressor (C2).

In certain embodiments, the compressor automatic drive unit (203) may automatically control the quantity of feed air released to the atmosphere from the standby-side compressor in accordance with the discharge quantity of the operation-side compressor and (the measured data from the flow rate measuring unit (F1) that measures) the flow rate of the feed air fed to the purification portion, and automatically stop the standby-side compressor when the quantity released to the atmosphere is at most equal to a threshold value.

In certain embodiments, the control unit (200) may include a refrigerator automatic drive unit (250) which: automatically operates the standby-side first refrigerator (R1) or second refrigerator (R2) if the temperature (measured data measured by a temperature measuring unit (T2)) of the feed air introduced into the pre-purification unit (50) is maintained at or above a first temperature threshold for a first duration; automatically stops the refrigerator that is to be put on standby, selected from among the first refrigerator (R1) and the second refrigerator (R2), if the temperature (measured data measured by the temperature measuring unit (T2)) of the feed air introduced into the pre-purification unit (50) is maintained at or below a second temperature threshold lower than the first temperature threshold for a second duration; and automatically stops the first refrigerator (R1) and the second refrigerator (R2) if the temperature (measured data measured by a temperature measuring unit (T1)) of the feed air sent to the upstream-side first refrigerator (R1) or second refrigerator (R2) is equal to or less than a third temperature threshold (or the first temperature threshold) and the temperature (measured data measured by the temperature measuring unit (T2)) of the feed air introduced into the pre-purification unit (50) is maintained at or below the second temperature threshold for the second duration.

In certain embodiments, the control unit (200) may include an adsorption processing time determining unit (260) which: calculates (calculates as time-series data) a quantity of moisture $M_w$ and a quantity of carbon dioxide Mc in the feed air on the basis of the temperature (measured data measured by the temperature measuring unit (T2) after cooling by the refrigerators) of the feed air introduced into the pre-purification unit (50), the pressure (measured data measured by a pressure measuring unit (P1) after cooling by the refrigerators) of the feed air introduced into the pre-purification unit (50), and the flow rate (measured data from the flow rate measuring unit (F1)) of the feed air fed to the purification portion; calculates (calculates as time-series data) a moisture adsorbable time $T_W$ during which moisture can be adsorbed by an adsorbent, and a carbon dioxide adsorbable time $T_c$ during which carbon dioxide can be adsorbed by the adsorbent, from the quantity of moisture $M_w$ and the quantity of carbon dioxide Mc, and the filling amount (and adsorption performance data) of the adsorbent in the pre-purification unit (50); and determines the value of the smaller of the moisture adsorbable time $T_W$ and the carbon dioxide adsorbable time $T_c$ to be an adsorption processing time $T_a$.

In certain embodiments, the control unit (200) may include a regeneration processing time determining unit (270) which: calculates an adsorbed moisture total weight $M_{wt}$ and an adsorbed carbon dioxide total weight Ma that have been adsorbed, from the quantity of moisture $M_w$ [g/m$^3$], the quantity of carbon dioxide Mc [g/m$^3$], and the adsorption processing time $T_a$; calculates the filling amount (and the adsorption performance data) of the adsorbent, a moisture desorption heat quantity $Q_w$ for desorbing the adsorbed moisture total weight $M_{wt}$ of moisture from the adsorbent, and a carbon dioxide desorption heat quantity $Q_c$ for desorbing the adsorbed carbon dioxide total weight Ma of carbon dioxide from the adsorbent; calculates a total desorption heat quantity $Q_t$ by adding the moisture desorption heat quantity $Q_w$ and the carbon dioxide desorption heat quantity $Q_c$; and calculates a regeneration processing time $T_r$ (heating regeneration processing time) by dividing the total desorption heat quantity $Q_t$ (kcal) by an amount of heat $Q_h$ [kcal/min] in heated waste gas that has been heated by a heating unit (52) (or the amount of heat in waste gas that has not been heated by the heating unit).

In certain embodiments, the air separation device is provided with a waste gas path (L14) that causes waste gas led out from the purification portion to pass through the main heat exchanger (1), and then feeds said waste gas to the pre-purification unit (50), and a releasing unit (54) for releasing waste gas, provided ahead of the pre-purification unit (50) in the waste gas path (L14) (downstream or upstream of the main heat exchanger (1)).

In certain embodiments, the purification portion may include a high pressure column (2) into which feed air that has passed through the main heat exchanger (1) is introduced, a condensing unit (3) for condensing high pressure column distillate led out from a column top portion (23) of the high pressure column (2), and a low pressure column (4) into which oxygen-enriched liquid led out from a column bottom portion (21) of the high pressure column (2) is introduced.

In certain embodiments, the purification portion may additionally include a crude argon column, a high-purity refined argon column, and a heat exchanger, for example.

In certain embodiments, the following advantages can be seen:
(1) Manual manipulations are reduced even if the production quantity increases or decreases significantly, and the load (production quantity) can be adjusted automatically in accordance with the demand;
(2) Release losses of product oxygen and product nitrogen can be significantly reduced;
(3) Operation (starting and stopping) of the compressors and refrigerators can be performed automatically; and/or
(4) The pre-purification processes (adsorption process, regeneration process) can be performed optimally.

BRIEF DESCRIPTION OF THE DRAWINGS

Further developments, advantages and possible applications of the invention can also be taken from the following description of the drawing and the exemplary embodiments. All features described and/or illustrated form the subject-matter of the invention per se or in any combination, independent of their inclusion in the claims or their back-references.

DETAILED DESCRIPTION OF THE INVENTION

Several modes of embodiment of the present invention will be described below. The embodiments described below are exemplary descriptions of the present invention. The present invention is in no way limited by the following modes of embodiment, and also includes a number of variant modes which are implemented within a scope that does not alter the meaning of the present invention. It should be noted that not all the constituent elements described below are necessarily essential constituent elements of the present invention.

Figure 1:
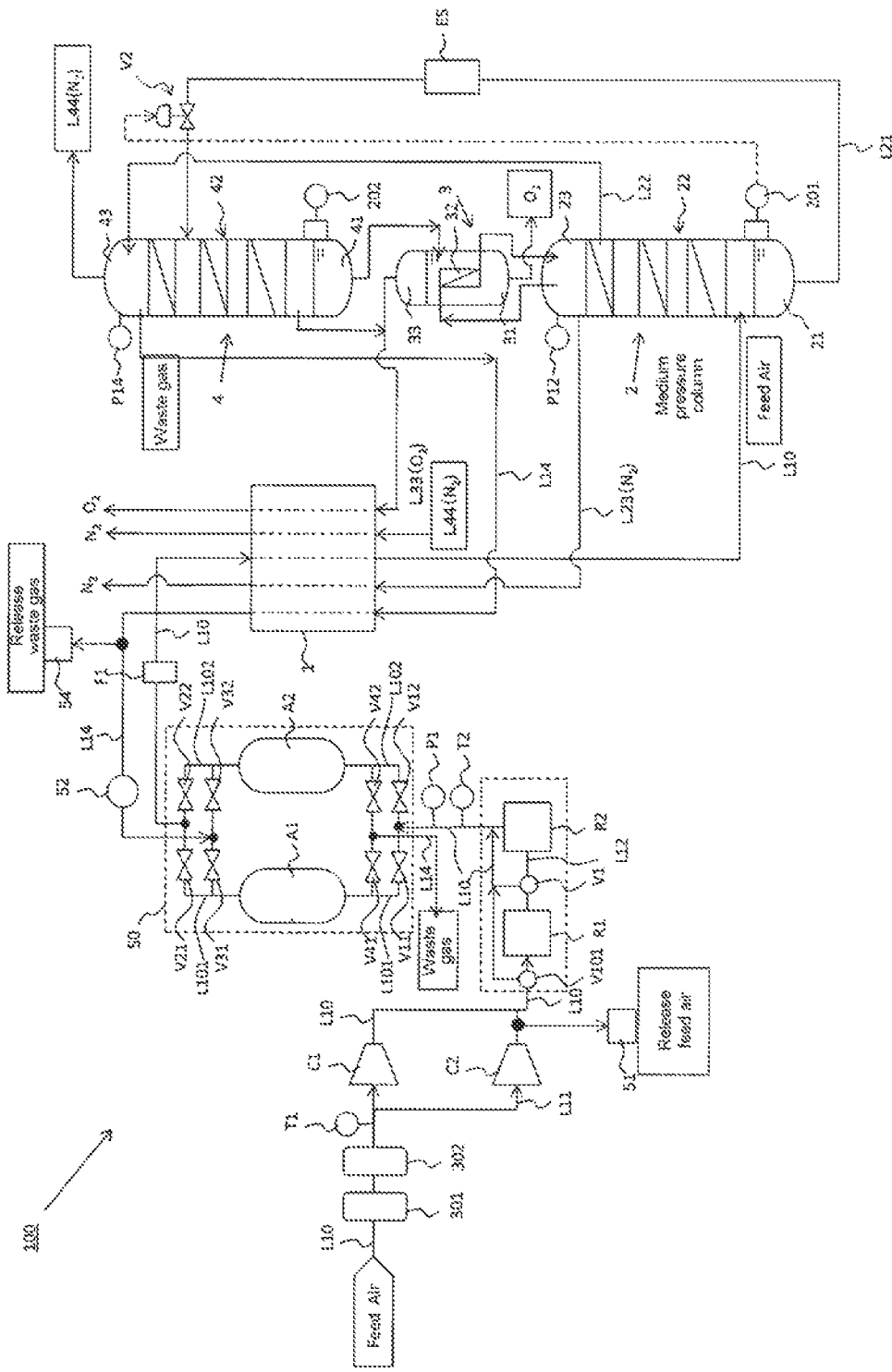
FIG. 1 is a drawing illustrating an air separation device according to embodiment 1.

The air separation device 100 in embodiment 1 will be described with reference to FIG. 1.

Feed air is passed through a filtering means 301 and a catalyst tower 302 on a path (pipeline) L10, to remove foreign matter and solid material from the air, and the temperature of the air is measured using the first temperature measuring unit T1, provided further downstream. The first compressor C1, which has first priority and is provided on the path L10, and the second compressor C2, which has second priority and is provided on a branch path L11 that branches from the path L10, are arranged in parallel. Normally, the first-priority first compressor C1 is in a constantly operating state, and the second compressor C2 is in a standby state and starts operating as the production quantity increases. Operation control of the compressors in the operating state and the standby state will be described in detail in the functional description of the compressor automatic drive unit 203.

The branch path L11 branches downstream of the second compressor C2, the main path therefrom merging with the path L10, and the branch path being connected to the vent 51 for release to the atmosphere. Control of the release of feed air to the atmosphere by the vent 51 will be described in detail in the functional description of the compressor automatic drive unit 203.

The compressed feed air that has been compressed is then cooled to a prescribed temperature by the first refrigerator R1 and the second refrigerator R2, which are arranged in series or in parallel.

The second temperature measuring unit T2 for measuring the temperature of the feed air introduced into the pre-purification unit 50, and the first pressure measuring unit P1 for measuring the pressure of the feed air, are provided on the path L10 upstream of the pre-purification unit 50.

(Pre-Purification Unit)

The pre-purification unit 50 is provided with a first adsorption tower A1, and a second adsorption tower A2 arranged in parallel with the first adsorption tower A1. An adsorption process is executed in one adsorption tower, a regeneration process is executed in the other adsorption tower, and the adsorption process and the regeneration process are executed alternately.

The adsorption process will first be described. The path L10, for introducing the feed air into the adsorption tower, branches into a first branch introduction path L101 connected to the first adsorption tower A1, and a second branch introduction path L102 connected to the second adsorption tower A2, and a first inlet valve V11 and a second inlet valve V12 are provided respectively in the first branch introduction path L101 and the second branch introduction path L102. If the adsorption process is to be performed in the first adsorption tower A1, the first inlet valve V11 is opened and the second inlet valve V12 is closed. If the adsorption process is to be performed in the second adsorption tower A2, the first inlet valve V11 is closed and the second inlet valve V12 is opened.

A first outlet valve V21 is provided in a first branch lead-out path L101 on the outlet side of the first adsorption tower A1, and a second outlet valve V22 is provided in a second branch lead-out path L102 on the outlet side of the second adsorption tower A2. If the adsorption process is to be performed in the first adsorption tower A1, the first outlet valve V21 is opened and the second outlet valve V22 is closed. If the adsorption process is to be performed in the second adsorption tower A2, the first outlet valve V21 is closed and the second outlet valve V22 is opened. In FIG. 1, the first branch lead-out path L101 and the second branch lead-out path L102 merge to become the path L10.

The feed air that has been pre-purified in the first adsorption tower A1 or the second adsorption tower A2 is introduced through the path L10 into the downstream main heat exchanger 1.

The regeneration process will next be described. Waste gas led out from a column top portion 43 of the low pressure column 4 is passed through the main heat exchanger 1 via the path L14, is heated by the heating unit 52, and is introduced into the pre-purification unit 50.

The path L14, which is a waste gas introduction path, branches into a first branch introduction path connected to the first adsorption tower A1, and a second branch introduction path connected to the second adsorption tower A2, and a first waste gas inlet valve V31 and a second waste gas inlet valve V32 are provided respectively in the first branch introduction path and the second branch introduction path. If the regeneration process is to be performed in the first adsorption tower A1, the first waste gas inlet valve V31 is opened and the second waste gas inlet valve V32 is closed. If the regeneration process is to be performed in the second adsorption tower A2, the first waste gas inlet valve V31 is closed and the second waste gas inlet valve V32 is opened.

A first waste gas outlet valve V41 is provided in a first branch lead-out path on the waste gas outlet side of the first adsorption tower A1, and a second waste gas outlet valve V42 is provided in a second branch lead-out path on the waste gas outlet side of the second adsorption tower A2. If the regeneration process is to be performed in the first adsorption tower A1, the first waste gas outlet valve V41 is opened and the second waste gas outlet valve V42 is closed. If the regeneration process is to be performed in the second adsorption tower A2, the first waste gas outlet valve V41 is closed and the second waste gas outlet valve V42 is opened. In FIG. 1, the first branch lead-out path and the second branch lead-out path merge to become the path L14, which is released to the atmosphere, for example.

(Purification Portion Configuration)

The air separation device 100 is provided with: the main heat exchanger 1; the high pressure column 2 into which feed air that has passed through the main heat exchanger 1 is introduced via the pipeline L10; the condensing unit (nitrogen condenser) 3 for condensing high pressure column distillate led out from the column top portion 23 of the high pressure column 2; and the low pressure column 4 into which oxygen-enriched liquid led out from the column bottom portion 21 of the high pressure column 2 is introduced.

The high pressure column 2 includes: the column bottom portion 21, which has a gas phase portion into which the feed air that has passed through the main heat exchanger 1 is introduced, and a liquid phase portion in which oxygen-enriched liquid collects; a purification portion 22 provided above the column bottom portion 21; and the column top portion 23 provided above the purification portion 22.

The column top portion 23 is provided with the pressure measuring unit P12 for measuring the pressure in the column top portion 23. The liquid level measuring unit 201 for measuring the liquid surface height of the oxygen-enriched liquid is provided in the column bottom portion 21 of the high pressure column 2. Various types of measured data are sent to the control unit 200 and are stored as time-series data in a memory 205.

The oxygen-enriched liquid led out from the column bottom portion 21 is subjected to heat exchange in a heat exchanger E5, and is then introduced via a pipeline L21 into a distillation stage that is the same as, or vertically close to, an intermediate stage of the distillation portion 42 of the low pressure column 4. The control valve V2 is provided in the pipeline L21, and the control valve V11 is controlled by the control unit 200 in accordance with the measured data from the liquid level measuring unit 201, thereby regulating the amount of oxygen-enriched liquid that is introduced.

High pressure column distillate (reflux liquid) led out through a path (pipeline) L23 from the column top portion 23 of the high pressure column 2 is sent to the main heat exchanger 1.

Gas (gas-liquid mixture) led out from an upper stage of the distillation portion 22 of the high pressure column 2 is sent via a path L22 to the column top portion 43 of the low pressure column 4.

The condenser 3 includes: a liquid phase portion 31 in which highly oxygen-enriched liquid (02) led out from a column bottom portion 41 of the low pressure column 4 collects; a cooling portion (32) which utilises the liquid phase portion 31 as a cold source, and which cools the high pressure column distillate led out from the column top portion 23 of the high pressure column 2; and a gas phase portion 33 above the liquid phase portion 31.

The high pressure column distillate cooled by the cooling portion 32 is returned to the column top portion 23 of the high pressure column 2 and is sent to the purification portion 22. A portion of the highly oxygen-enriched liquid (02) used for heat exchange in the cooling portion 32 becomes gaseous and is sent from the gas phase portion 33 to the main heat exchanger 1 via a path L33. Meanwhile, the highly oxygen-enriched liquid (02) in the liquid phase portion 31 is sent to a product tank and is used as product oxygen. The oxygen concentration of the highly oxygen-enriched liquid (02) is higher than the oxygen concentration of the oxygen-enriched liquid.

The low pressure column 4 includes: the column bottom portion 41 in which the highly oxygen-enriched liquid (02) collects; a purification portion 42 provided above the column bottom portion 41; and the column top portion 43 provided above the purification portion 42.

The column top portion 43 is provided with the pressure measuring unit P14 for measuring the pressure in the column top portion 43. The liquid level measuring unit 202 for measuring the liquid surface height of the highly oxygen-enriched liquid (02) is provided in the column bottom portion 41 of the high pressure column 4. Measured data are sent to the control unit 200 and are stored as time-series data in the memory 205.

Waste gas (low pressure column top portion distillate) led out from the column top portion 43 is sent to the main heat exchanger 1 via the path L14, and is then used as regeneration gas. Further, low pressure column top portion distillate led out from the column top portion 43 is sent to the main heat exchanger 1 via a path L44, either directly or after heat exchange in the heat exchanger E5. Gas led out from the gas phase portion of the column bottom portion 41 merges with the path L33 and is sent to the main heat exchanger 1.

The flow rate measuring unit F1 for measuring the flow rate (introduction quantity) of feed air is provided in the path L10 from the pre-purification unit 50 to the main heat exchanger 1.

The vent 54 for releasing waste gas is provided between the main heat exchanger 1 and the heating unit 52 in the path L14 extending from the column top portion 43 to the pre-purification unit 50.

(Control Unit Configuration)

Figure 2:
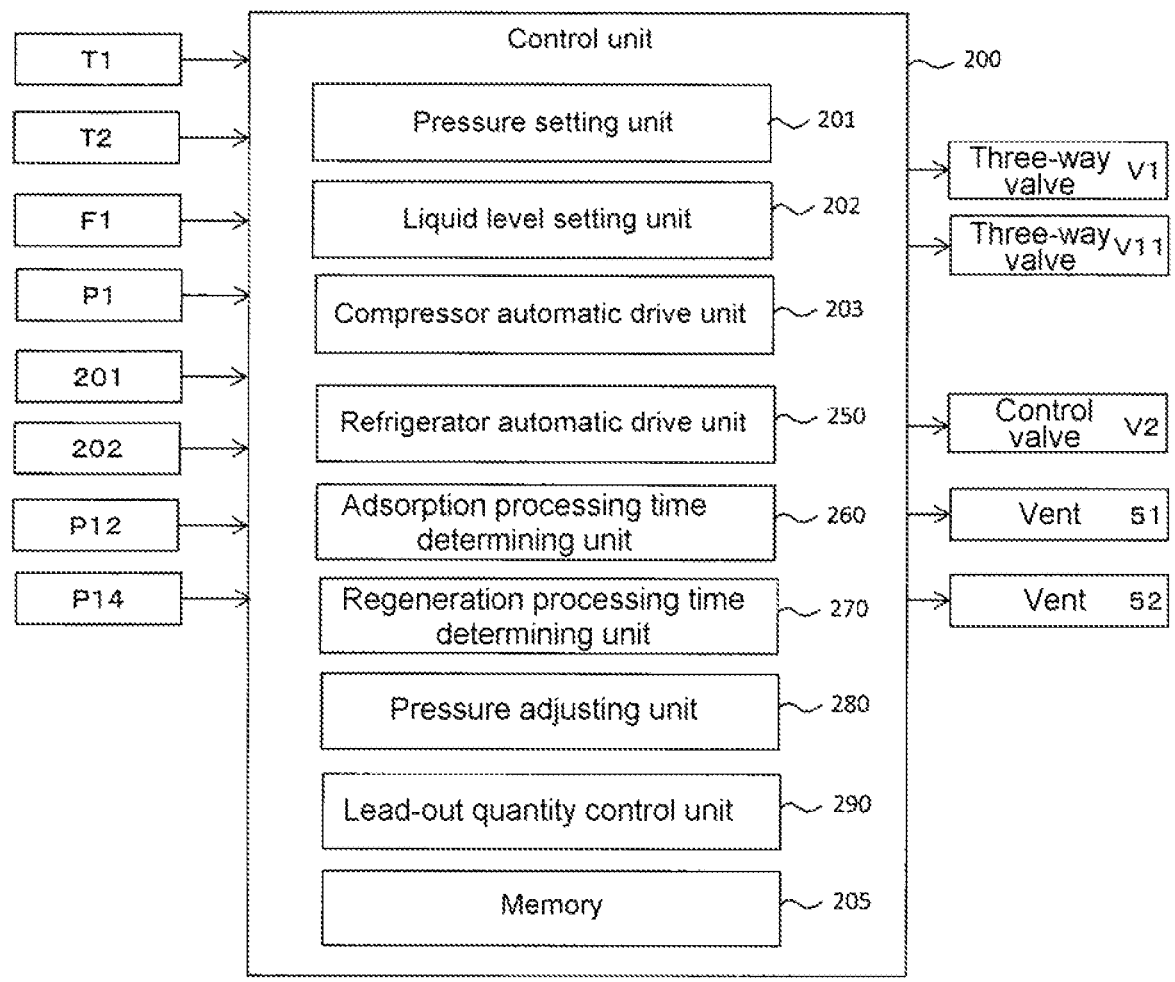
FIG. 2 is a drawing illustrating an example of the control elements of the air separation device according to embodiment 1.

FIG. 2 illustrates the configuration of the control unit 200. The control unit 200 controls the feed quantity (introduction quantity) of feed air in accordance with an increase or decrease in the production quantity of product nitrogen and/or product oxygen. For example, the control unit 200 can control the production quantity of product nitrogen and/or product oxygen by controlling the opening degree of the discharge valve of the first compressor C1 to control the discharge quantity from the first compressor C1, and controlling the opening degree of the discharge valve of the second compressor C2 to control the discharge quantity from the second compressor C2, thereby controlling the total discharge quantity. The total discharge quantity can be monitored using the flow rate measuring unit F1. The control unit 200 includes the pressure setting unit 201, the liquid level setting unit 202, the compressor automatic drive unit 203, the pressure adjusting unit 280, and the lead-out quantity control unit 290.

The pressure setting unit 201 determines the pressure setting value for the column top portion 43 of the low pressure column 4 in accordance with measured data from the flow rate measuring unit F1 that measures the introduction quantity of feed air fed to the high pressure column 2. The pressure adjusting unit 280 adjusts the pressure in the column top portion 43 of the low pressure column 4 by using the vent 54 to control the released quantity of waste gas that is led out from the column top portion 43 of the low pressure column 4 and is released to the atmosphere, such that pressure data measured by the pressure measuring unit P14 achieve the pressure setting value.

The liquid level setting unit 202 determines (a range from an upper limit to a lower limit of) a liquid level setting value for the oxygen-enriched liquid collected in the distillation portion 21 of the high pressure column 2, in accordance with the measured data from the flow rate measuring unit F1. The lead-out quantity control unit 290 controls the opening degree of the control valve V2 to adjust the lead-out quantity of oxygen-enriched liquid sent from the column bottom portion 21 of the high pressure column 2 to the distillation portion 42 of the low pressure column 4, in such a way that the measured data from the liquid level measuring unit 201 achieve the liquid level setting value.

Performing double feedback control of the liquid level in the high pressure column 2 and the pressure in the low pressure column, as described hereinabove, enables operation to be carried out without a deterioration in the separation performance even if the introduction quantity of feed air increases or decreases in response to a change in the load of the air separation device.

(Starting and Stopping of Standby Compressor)

The compressor automatic drive unit 203 automatically starts the standby-side second compressor C2 when the measured data from the flow rate measuring unit F1 are at least equal to a first flow rate threshold, and automatically stops the second compressor C2 (compressor to be put on standby) when the measured data from the flow rate measuring unit F1 are at most equal to a second flow rate threshold lower than the first flow rate threshold.

Further, the compressor automatic drive unit 203 can perform control such that the discharge valve of the second compressor C2 is changed from closed to open, to merge with the feed air discharged from the first compressor C1, if the pressure difference between the discharge pressure (the discharge pressure is measured by a pressure measuring unit provided in the compressor) of the second compressor C2 that has started automatically and the discharge pressure of the first compressor C1 is at most equal to a threshold value.

Further, the compressor automatic drive unit 203 can control the vent 51 that releases to the atmosphere and that is provided on the discharge side of the first and second compressors C1, C2, such that the quantity of feed air that has been discharged from the second compressor C2 and is released to the atmosphere is increased or decreased, and the quantity thereof that is caused to merge with the feed air discharged from the first compressor C1 is decreased or increased, in accordance with the measured data from the flow rate measuring unit F1.

Further, the compressor automatic drive unit 203 can automatically control the quantity of feed air released to the atmosphere from the second compressor C2 in accordance with the discharge quantity of the first compressor C1 and the measured data from the flow rate measuring unit F1, and automatically stop the second compressor C2 when the quantity released to the atmosphere is at most equal to a threshold.

As described hereinabove, starting and stopping of the standby state compressor can be performed quickly in response to an increase or decrease in the load on the air separation device, and therefore the pressure of the feed air introduced into the high pressure column 2 can be stabilised, and power consumption can also be reduced.

(Starting and Stopping of Standby State Refrigerator)

The control unit 200 includes the refrigerator automatic drive unit 250.

The refrigerator automatic drive unit 250 automatically operates the standby-side second refrigerator R2 if the temperature (measured data measured by the temperature measuring unit T2) of the feed air introduced into the pre-purification unit 50 is maintained at or above a first temperature threshold (for example, a value selected from the range of 15° C. to 20° C.) for a first duration (for example, between 5 minutes and 30 minutes).

Further, the refrigerator automatic drive unit 250 automatically stops the second refrigerator R2 (refrigerator to be put on standby) if the temperature (measured data measured by the temperature measuring unit (T2)) of the feed air introduced into the pre-purification unit 50 is maintained at or below a second temperature threshold (for example, a value selected from the range of 10° C. to 14° C.) lower than the first temperature threshold for a second duration (for example, between 2 minutes and 20 minutes).

The first duration is preferably longer than the second duration. The first and second temperature thresholds are set in accordance with the design specification of the air separation device.

Further, the refrigerator automatic drive unit 250 automatically stops the first refrigerator R1 and the second refrigerator R2 if the temperature (measured data measured by the temperature measuring unit (T1)) of the feed air sent to the upstream-side first refrigerator R1 is equal to or less than a third temperature threshold (for example, a value selected from the range of 15° C. to 20° C.) and the temperature (measured data measured by the temperature measuring unit (T2)) of the feed air introduced into the pre-purification unit 50 is maintained at or below the second temperature threshold (for example, a value selected from the range of 10° C. to 14° C.) for the second duration (for example, between 2 minutes and 20 minutes).

As described hereinabove, starting and stopping of the standby state refrigerator can be performed quickly in response to an increase or decrease in the load on the air separation device, and therefore the temperature of the feed air introduced into the high pressure column 2 can be stabilised, and power consumption can also be reduced.

(Optimisation of Adsorption Process and Regeneration Process)

The control unit 200 includes the adsorption processing time determining unit 260 and the regeneration processing time determining unit 270. The adsorption processing time determining unit 260: calculates the quantity of moisture $M_w$ and the quantity of carbon dioxide Mc in the feed air on the basis of the temperature (measured data measured by the temperature measuring unit (T2) after cooling by the refrigerators) of the feed air introduced into the pre-purification unit 50, the pressure (measured data measured by the pressure measuring unit (P1) after cooling by the refrigerators) of the feed air introduced into the pre-purification unit 50, and the flow rate (measured data from the flow rate measuring unit (F1)) of the feed air fed to the purification portion 50; calculates the moisture adsorbable time $T_W$ during which moisture can be adsorbed by an adsorbent, and the carbon dioxide adsorbable time $T_c$ during which carbon dioxide can be adsorbed by the adsorbent, from the quantity of moisture $M_w$ and the quantity of carbon dioxide Mc, and the filling amount (and adsorption performance data) of the adsorbent in the pre-purification unit 50; and determines the value of the smaller of the moisture adsorbable time $T_W$ and the carbon dioxide adsorbable time $T_c$ to be the adsorption processing time $T_a$.

More specifically, said determination can be made using the following formulae.

(Formula 1)

Quantity of moisture $M_w$ (quantity of water vapour) [g/m³] in feed air=saturated water vapour quantity (predetermined for each temperature)×relative humidity [% RH]

Relative humidity [% RH]=water vapour pressure [Pa]/saturated water vapour pressure [Pa]

The saturated water vapour pressure is obtained using the saturated water vapour pressure table presented in JIS28806, or using the Sonntag formula.

The water vapour pressure is deemed to be the pressure of the feed air.

A value measured by a relative humidity measuring unit may be used as the relative humidity.

Moisture adsorbable time $T_W$=quantity of moisture adsorbed per unit mass [kg]×filling amount [kg]÷(quantity of moisture $M_w$ [g/m³] in feed air×flow rate [m³/h] of feed air)

(Formula 2)

Quantity of carbon dioxide Mc [g/m³] in feed air=mass of feed air per 1 m³×volume ratio of carbon dioxide× average molecular weight of air (28.8 g/mol)/molecular weight of carbon dioxide (44 g/mol)×temperature correction coefficient (γ)

The temperature correction coefficient (γ) is a correction coefficient that takes temperature changes into account, and is predetermined for each temperature.

Carbon dioxide adsorbable time $T_c$=quantity of carbon dioxide adsorbed per unit mass [kg]×filling amount [kg]÷(quantity of carbon dioxide Mc [g/m³] in feed air×flow rate [m³/h] of feed air)

(Formula 3)

Adsorption processing time $T_a$=MIN (moisture adsorbable time $T_W$, carbon dioxide adsorbable time $T_c$)

Further, as another embodiment, the adsorption processing time determining unit (260) may: calculate the moisture adsorbable time and the carbon dioxide adsorbable time from the quantity of moisture $M_w$ [g/m³] in the feed air, measured using a moisture measuring unit, the quantity of carbon dioxide Mc [g/m³] in the feed air, measured using a carbon dioxide concentration measuring unit (converting the concentration into mass), and the filling amount (and adsorption performance data) of the adsorbent in the pre-purification unit (50); and determine the value of the smaller of the moisture adsorbable time and the carbon dioxide adsorbable time to be the adsorption processing time.

The regeneration processing time determining unit 270: calculates the adsorbed moisture total weight $M_{wt}$ and the adsorbed carbon dioxide total weight Ma that have been adsorbed, from the quantity of moisture $M_w$ [g/m³] and the quantity of carbon dioxide Mc [g/m³]; calculates the filling amount (and the adsorption performance data) of the adsorbent, the moisture desorption heat quantity $Q_w$ for desorbing the adsorbed moisture total weight $M_{wt}$ of moisture from the adsorbent, and the carbon dioxide desorption heat quantity $Q_c$ for desorbing the adsorbed carbon dioxide total weight Ma of carbon dioxide from the adsorbent; calculates the total desorption heat quantity $Q_t$ by adding the moisture desorption heat quantity $Q_w$ and the carbon dioxide desorption heat quantity $Q_c$; and calculates the regeneration processing time $T_r$ by dividing the total desorption heat quantity $Q_t$ [kcal] by the amount of heat $Q_h$ [kcal/min] in the heated waste gas that has been heated by the heating unit 52.

More specifically, said determination is made using the following formulae.

(Formula 4)

Adsorbed moisture total weight $M_{wt}$ [g]=quantity of moisture $M_w$ [g/m³]×adsorption processing time $T_a$ [h]×flow rate [m³/h] of feed air Adsorbed carbon dioxide total weight Ma [g]=quantity of carbon dioxide Mc [g/m³]×adsorption processing time $T_a$ [h]×flow rate [m³/h] of feed air (Formula 5)

Moisture desorption heat quantity $Q_w$ [kcal]=adsorbed moisture total weight $M_{wt}$ [g]×moisture desorption heat quantity [kcal/g] per unit of adsorbent Carbon dioxide desorption heat quantity $Q_c$ [kcal]=adsorbed carbon dioxide total weight Ma [g]×carbon dioxide desorption heat quantity [kcal/g] per unit of adsorbent Total desorption heat quantity $Q_t$ [kcal]=moisture desorption heat quantity $Q_w$ [kcal]+carbon dioxide desorption heat quantity $Q_c$ [kcal]

(Formula 6)

Regeneration processing time $T_r$ [min]=total desorption heat quantity $Q_t$ [kcal]÷amount of heat $Q_h$ [kcal/min] in heated waste gas As described hereinabove, since the adsorption processing time can be determined and the regeneration processing time can be determined, the adsorbent utilisation efficiency increases markedly compared with a case in which the adsorption and regeneration processing is performed using a predetermined time, and waste gas that is used as the regeneration gas can be utilised without waste.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

1 Main heat exchanger
2 High pressure column
21 Column bottom portion
22 Distillation portion
23 Column top portion
3 Condenser
4 Low pressure column
41 Column bottom portion
42 Distillation portion
44 Column top portion
E5 Heat exchanger
C1 First compressor
C2 Second compressor
R1 First refrigerator
R2 Second refrigerator
A1 First adsorption tower
A2 Second adsorption tower
50 Pre-purification unit
201 Liquid level measuring unit
V2 Control valve

What is claimed is:

1. An air separation device comprising:
a first compressor configured to compress a feed air;
a second compressor installed in series or in parallel with the first compressor;
a first refrigerator configured to cool the feed air that has been compressed by the first compressor and/or the second compressor;
a second refrigerator in series or in parallel with the first refrigerator;
a pre-purification unit configured to pre-purify the feed air that has been cooled by the first refrigerator and/or the second refrigerator;
a flow rate measuring unit configured to measure the flow rate of the feed air that has been pre-purified by the pre-purification unit;
a main heat exchanger, into which the feed air that has been pre-purified by the pre-purification unit is introduced for heat exchange;
a purification portion into which the feed air led out from the main heat exchanger is fed, and which separates and purifies product nitrogen and/or product oxygen from the feed air; and a compressor control unit configured to control the feed quantity of feed air in accordance with an increase or decrease in the production quantity of product nitrogen and/or product oxygen, wherein the compressor control unit comprises:
a pressure setting unit which determines a pressure setting value in accordance with the flow rate of the feed air fed to the purification portion;
a liquid level setting unit which, in accordance with the flow rate of the feed air fed to the purification portion, determines a liquid level setting value for oxygen-enriched liquid collected in the distillation portion; and
a compressor automatic drive unit which automatically starts the standby-side first compressor or second compressor if the flow rate of the feed air is at least equal to a first flow rate threshold, and automatically stops the compressor that is to be put on standby, selected from among the first compressor and the second compressor, if the flow rate of the feed air is at most equal to a second flow rate threshold lower than the first flow rate threshold.

2. The air separation device according to claim 1, further comprising a refrigerator automatic drive unit which is configured to:
automatically operate the standby-side first refrigerator or second refrigerator if the temperature of the feed air introduced into the pre-purification unit is at or above a first temperature threshold for a first duration;
automatically stop the refrigerator that is to be put on standby, selected from among the first refrigerator and the second refrigerator, if the temperature of the feed air introduced into the pre-purification unit is maintained at or below a second temperature threshold lower than the first temperature threshold for a second duration; and
automatically stop the first refrigerator and the second refrigerator if the temperature of the feed air sent to the upstream-side first refrigerator or second refrigerator is equal to or less than a third temperature threshold and the temperature of the feed air introduced into the pre-purification unit is maintained at or below the second temperature threshold for the second duration.

3. The air separation device according to claim 1, further comprising an adsorption processing time determining unit which:
calculates a quantity of moisture and a quantity of carbon dioxide in the feed air on the basis of the temperature of the feed air introduced into the pre-purification unit, the pressure of the feed air introduced into the pre-purification unit, and the flow rate of the feed air fed to the purification portion;
calculates a moisture adsorbable time during which moisture can be adsorbed by an adsorbent, and a carbon dioxide adsorbable time during which carbon dioxide can be adsorbed by the adsorbent, from the quantity of moisture and the quantity of carbon dioxide, and the filling amount of the adsorbent in the pre-purification unit; and
determines the value of the smaller of the moisture adsorbable time and the carbon dioxide adsorbable time to be an adsorption processing time.

4. The air separation device according to claim 3, further comprising a regeneration processing time determining unit which:
calculates an adsorbed moisture total weight and an adsorbed carbon dioxide total weight that have been adsorbed, from the quantity of moisture, the quantity of carbon dioxide, and the adsorption processing time;

calculates a moisture desorption heat quantity for desorbing the adsorbed moisture total weight of moisture from the adsorbent, and a carbon dioxide desorption heat quantity for desorbing the adsorbed carbon dioxide total weight of carbon dioxide from the adsorbent;

calculates a total desorption heat quantity by adding the moisture desorption heat quantity and the carbon dioxide desorption heat quantity; and calculates a regeneration processing time by dividing the total desorption heat quantity by an amount of heat in heated waste gas that has been heated by a heating unit.

* * * * *